(12) United States Patent
Ishimaru et al.

(10) Patent No.: US 10,766,237 B2
(45) Date of Patent: Sep. 8, 2020

(54) POLYESTER FILM, LAMINATE, AND PACKAGING BAG

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/313,746

(22) PCT Filed: Jun. 20, 2017

(86) PCT No.: PCT/JP2017/022661
§ 371 (c)(1),
(2) Date: Dec. 27, 2018

(87) PCT Pub. No.: WO2018/003598
PCT Pub. Date: Jan. 4, 2018

(65) Prior Publication Data
US 2019/0315107 A1    Oct. 17, 2019

(30) Foreign Application Priority Data
Jun. 30, 2016    (JP) .................................. 2016-129859

(51) Int. Cl.
*B32B 27/36*    (2006.01)
*B65D 65/40*    (2006.01)

(52) U.S. Cl.
CPC .............. *B32B 27/36* (2013.01); *B65D 65/40* (2013.01); *B32B 2307/516* (2013.01); *B32B 2307/518* (2013.01); *B32B 2439/00* (2013.01)

(58) Field of Classification Search
CPC .............. B32B 27/36; B32B 2307/516; B32B 2307/518; B32B 2439/00; B32B 7/022; B32B 27/08; B32B 2307/308; B65D 65/40
See application file for complete search history.

(56) References Cited

U.S. PATENT DOCUMENTS

2005/0019595 A1    1/2005    Kim et al.
2016/0108171 A1*   4/2016    Haruta .................... B32B 27/36
                                                    428/35.2

FOREIGN PATENT DOCUMENTS

JP    H07-005762 B2    1/1995
JP    2009012481 A  *  1/2009
(Continued)

OTHER PUBLICATIONS

[NPL-1] Hashida (JP 2015-160375 A); Sep. 2015 (EPO machine translation to English). (Year: 2015).*
(Continued)

*Primary Examiner* — David Sample
*Assistant Examiner* — Donald M Flores, Jr.
(74) *Attorney, Agent, or Firm* — Leydig, Voit & Mayer, Ltd.

(57) ABSTRACT

The polyester film is formed with a polyester resin whose main constituent component is ethylene terephthalate. The polyester film has two or more layers that include at least one fold holding layer, which is present on at least one of the film surfaces and has a total of at least one monomer component that can form an amorphous component of 12-30% by mol in all monomer components of the fold holding layer and a difference in amount of an amorphous component of 4-30% by mol obtained by deducting an amount of an amorphous component in a layer other than the fold holding layer from the amount of the amorphous component in the fold holding layer. The polyester film has a fold holding angle of 20-70 degrees and a heat shrinkage rate of 0-15% in the longitudinal and width directions when treated in 80° C. hot water for 10 seconds.

14 Claims, 1 Drawing Sheet

(56) References Cited

FOREIGN PATENT DOCUMENTS

| JP | 4308662 B2 | | 8/2009 |
|---|---|---|---|
| JP | 2015-160375 A | | 9/2015 |
| JP | 2015160375 A | * | 9/2015 |

OTHER PUBLICATIONS

[NPL-2] Aritake (JP 2009-012481 A); Jan. 2009 (EPO machine translation to English). (Year: 2009).*
Japanese Patent Office, International Search Report in International Patent Application No. PCT/JP2017/022661 (dated Sep. 26, 2017).
China National Intellectual Property Administration, The First Office Action in Chinese Patent Application No. 201780040411.5 (Jun. 5, 2020).

* cited by examiner

POLYESTER FILM, LAMINATE, AND PACKAGING BAG

CROSS-REFERENCE TO RELATED APPLICATIONS

This patent application is the U.S. national phase of International Patent Application No. PCT/JP2017/022661, filed Jun. 20, 2017, which claims the benefit of Japanese Patent Application No. 2016-129859, filed on Jun. 30, 2016, which are incorporated by reference in their entireties herein.

TECHNICAL FIELD

The present invention relates to a polyester film that is usable as, for example, a packaging material, a carrier bag, and folding paper and is excellent in fold holding property. The present invention relates to a polyester film excellent in water resistance, low shrinkage property at a high-temperature environment, aroma retaining property, and transparency, and a laminate and a packaging bag that include the polyester film.

BACKGROUND ART

Paper is being widely used as, for example, various packaging paper, carrier bags, and folding paper for its excellent fold holding property. Paper, however, is inferior in water resistance, so that paper sometimes causes breakage or discoloration of printing when being wet by, for example, rain. Further, paper has no transparency to have a problem of not allowing contents to be seen therethrough when served for packaging as, for example, a bag. Therefore, a plastic film has been studied as a product in place of paper.

Transparent cellophane has been used as a film excellent in fold holding property. Cellophane, however, has hygroscopicity to vary its characteristics depending on the season, making it difficult to supply cellophane with constant product quality, and cellophane has been recognized to have a drawback for its bad processability attributed to ununiformity of thickness.

On the other hand, a polyethylene terephthalate film has an advantage of having excellent characteristics such as toughness, water resistance, and transparency, whereas it has had a drawback of being inferior in fold holding property.

As a method of overcoming this drawback, a polyethylene terephthalate film has been disclosed that is reduced in density of the film to be capable of retaining a good fold holding property (for example, see Patent Document 1).

The polyethylene terephthalate film in Patent Document 1, however, has a problem of having a large heat shrinkage property. It is pointed out that leaving a bag or the like including such a film in, for example, a car in midsummer or a warehouse without a temperature controller makes the bag or the like unusable due to shrinkage or distortion of the film. Further, such a film also has had a problem of being unprocessable for its shrinkage in a working process, such as printing on the film, that requires high temperature.

When a film excellent in fold holding property is processed into a bag shape for use, the film can be closed at its opening only by twisting to give a merit of requiring no work such as tying the opening. A polyethylene film is known as a film excellent in fold holding property (for example, see Patent Document 2). The polyethylene film in Patent Document 2, however, has a drawback of being insufficient in aroma retaining property. When contents in a bag have smell, the smell passes through the polyethylene film even with the opening of the bag closed.

PRIOR ART DOCUMENT

Patent Document

Patent Document 1: JP-B-4308662 (Patent Publication)
Patent Document 2: JP-B-H07-5762 (Kokoku Publication)

DISCLOSURE OF THE INVENTION

Problems to be Solved by the Invention

An object of the present invention is to solve the problems of the conventional techniques described above. That is, an object of the present invention is to provide a polyester film that has an excellent fold holding property and a small heat shrinkage property and is excellent in aroma retaining property and transparency.

Solutions to the Problems

The present invention has the following constitution.

1. A polyester film which is formed with a polyester resin whose main constituent component is ethylene terephthalate as a main component, and satisfies requirements (1) to (4) below:

(1) the polyester film having two or more layers that include at least one fold holding layer, and wherein the fold holding layer is present on at least one of the film surfaces;

(2) the fold holding layer having a total of at least one monomer component that can form an amorphous component (amount of an amorphous component) of 12% by mol or more and 30% by mol or less in all monomer components of the fold holding layer, and a difference in amount of an amorphous component being 4% by mol or more and 30% by mol or less that is obtained by deducting an amount of an amorphous component in a layer other than the fold holding layer from the amount of the amorphous component in the fold holding layer;

(3) the polyester film having a fold holding angle of 20 degrees or more and 70 degrees or less; and (4) the polyester film having a heat shrinkage rate of 0% or more and 15% or less both in a longitudinal direction and a width direction when treated in 80° C. hot water over 10 seconds.

2. The polyester film according to above 1, which has a haze of 1% or more and 12% or less.

3. The polyester film according to above 1 or 2, which has a thickness unevenness of 18% or less both in the longitudinal direction and the width direction.

4. The polyester film according to any one of above 1 to 3, which is a uniaxially stretched film or a biaxially stretched film.

5. A packaging bag including at least one of the polyester film according to any one of above 1 to 4.

6. A laminate comprising at least one layer of the polyester film according to any one of above 1 to 4.

7. A packaging bag including at least one of the laminate according to above 6.

Effect of the Invention

A polyester film according to the present invention has an excellent fold holding property and a small heat shrinkage rate and is excellent in transparency. In addition, the polyester film according to the present invention is excellent in aroma retaining property to give a laminate and a packaging bag that are excellent in aroma retaining property, the laminate including at least one layer of the polyester film according to the present invention, and the packaging bag including the laminate.

MODE FOR CARRYING OUT THE INVENTION

Figure 1:
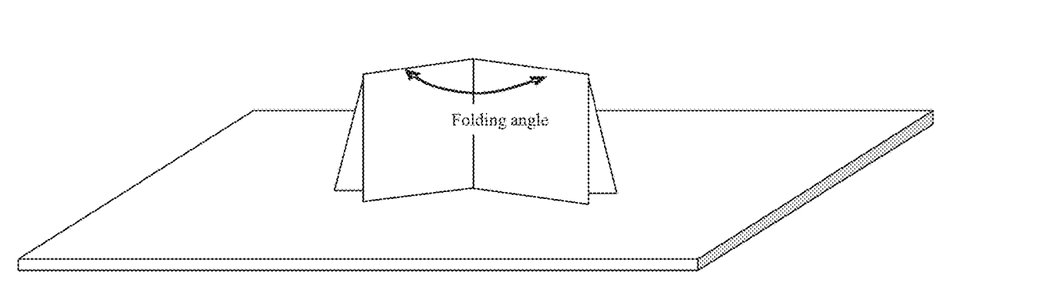
The FIGURE is a schematic diagram showing a method for measuring a fold holding angle.

A polyester film of the present invention is formed with a polyester resin whose main constituent component is ethylene terephthalate as a main component, and satisfies requirements (1) to (4) below:

(1) the polyester film having two or more layers that include at least one fold holding layer, and wherein the fold holding layer is present on at least one of the film surfaces;

(2) the fold holding layer having a total of at least one monomer component that can form an amorphous component (amount of an amorphous component) of 12% by mol or more and 30% by mol or less in all monomer components of the fold holding layer, and a difference in amount of an amorphous component being 4% by mol or more and 30% by mol or less that is obtained by deducting an amount of an amorphous component in a layer other than the fold holding layer from the amount of the amorphous component in the fold holding layer;

(3) the polyester film having a fold holding angle of 20 degrees or more and 70 degrees or less; and (4) the polyester film having a heat shrinkage rate of 0% or more and 15% or less both in a longitudinal direction and a width direction when treated in 80° C. hot water over 10 seconds.

The polyester film according to the present invention that satisfies the requirements is a polyester film excellent in fold holding property. Further, the film has a good aroma retaining property to give a packaging bag excellent in aroma retaining property. Further, the film has low shrinkage when heated, so that the film is capable of retaining its shape even under a high-temperature environment. In addition, the polyester film according to the present invention is good in thickness accuracy to be good in printing processability and have high transparency.

In particular, the fold holding property, the low shrinkage property, and the good thickness accuracy are characteristics incompatible with each other, so that no polyester film has been heretofore provided that is capable of satisfying all these characteristics. Hereinafter, the polyester film according to the present invention is described.

1. Layer Structure of Polyester Film

The polyester film according to the present invention has two or more film layers to achieve both a low shrinkage property and an excellent fold holding property, and at least one of surface layers is to be a fold holding layer. Structure requirements involving the fold holding layer and a layer other than the fold holding layer are described later. A preferable layer structure of the polyester film is a two-kind three-layer structure including fold holding layers as both surface layers and including, as a center layer, a layer other than the fold holding layer.

The polyester film preferably has a layer ratio of the fold holding layer of 20% or more and 80% or less. The polyester film having a ratio of the fold holding layer of less than 20% is not preferred because the polyester film decreases its fold holding property. The polyester film having a layer ratio of the fold holding layer of more than 80% is preferred in terms of improvement in fold holding property of the film but is not preferred in terms of an increase in shrinkage rate to higher than 15%. The polyester film more preferably has a layer ratio of the fold holding layer of 30% or more and 70% or less.

The fold holding layer and a layer other than the fold holding layer can be provided with a layer subjected to, for example, a corona treatment, coating, or a flame treatment, to improve the adhesiveness on a surface of the film, and any layer can be provided without departing from the requirements of the present invention.

2. Polyester Raw Materials Constituting Polyester Film 2.1. Kinds of Polyester Raw Materials A polyester used in the present invention is a polyester containing an ethylene terephthalate unit as a main constituent component. The phrase "containing an ethylene terephthalate unit as a main constituent component" refers to containing 50% by mol of the ethylene terephthalate unit in 100% by mol of constituent units of the polyester.

Further, the polyester used in the present invention preferably contains, as a component other than the ethylene terephthalate unit, at least one monomer component that can form an amorphous component (hereinafter, simply described as an amorphous component). This is because the existence of the amorphous component improves the fold holding property of the film. The content of each component is described later because it is different between the fold holding layer and a layer other than the fold holding layer. Examples of a monomer of a carboxylic acid component that can form the amorphous component include such as isophthalic acid, 1,4-cyclohexanedicarboxylic acid, and 2,6-naphthalenedicarboxylic acid.

Further, examples of a monomer of a diol component that can form the amorphous component include such as neopentyl glycol, 1,4-cyclohexane dimethanol, 2,2-diethyl 1,3-propanediol, 2-n-butyl-2-ethyl-1,3-propanediol, 2,2-isopropyl-1,3-propanediol, 2,2-di-n-butyl-1,3-propanediol, and hexanediol.

At least any one or more of isophthalic acid, neopentyl glycol, and 1,4-cyclohexane dimethanol among these amorphous components is used to increase the amorphous property of the film and thus easily attain a fold holding angle of 70 degrees or less. At least any one or more of neopentyl glycol and 1,4-cyclohexane dimethanol is more preferably used, and neopentyl glycol is particularly preferably used.

In the present invention, the polyester may contain a component other than ethylene terephthalate and the amorphous component. Examples of a dicarboxylic acid component that constitutes the polyester include aromatic dicarboxylic acids such as orthophthalic acid, aliphatic dicarboxylic acids such as adipic acid, azelaic acid, sebacic acid, and decanedicarboxylic acid, and an alicyclic dicarboxylic acid. However, no tri- or higher polyhydric carboxylic acid (for example, trimellitic acid, pyromellitic acid, and anhydrides thereof) is preferably contained in the polyester.

Further, examples of a diol component that constitutes the polyester and is other than ethylene glycol include long chain diols such as diethylene glycol and 1,4-butanediol, aliphatic diols such as hexanediol, and aromatic diols such as bisphenol A. The polyester, however, preferably contains no diol with 8 or more carbon atoms (for example, octanediol) or tri- or higher polyhydric alcohol (for example, trimethylolpropane, trimethylolethane, glycerin, and diglycerin).

Further, the polyester may also contain, as its constituent component, a polyester elastomer containing, for example, ε-caprolactone or tetramethylene glycol. The polyester elastomer has an effect of increasing the flexibility of the film and thus decreasing the fold holding angle, so that the polyester elastomer can be suitably used particularly for the fold holding layer.

To the film of the present invention, various additives, for example, waxes, an antioxidant, an antistatic agent, a nucleating agent, a viscosity-reducing agent, a thermal stabilizer, a pigment for coloring, a coloring-preventing agent, an ultraviolet absorber and the like can be added, as necessary. In addition, fine particles as a lubricant that improves slipperiness of the film are preferably added at least to the surface layer of the film. Arbitrary one can be selected as fine particles. Examples of inorganic fine particles include silica, alumina, titanium dioxide, calcium carbonate, kaolin, barium sulfate and the like, and examples of organic fine particles include acrylic resin particles, melamine resin particles, silicone resin particles, crosslinked polystyrene particles and the like. The average particle size of the fine particles is within the range of 0.05 to 3.0 μm when measured with a coulter counter, and can be properly selected as necessary.

As the method for blending the particles to the film of the present invention, for example, the particles can be added in an arbitrary stage during the production of a polyester resin, but it is preferred to add the particles as slurry dispersed in ethylene glycol or the like in the esterification stage or the stage after the completion of the transesterification and before the start of the polycondensation reaction, and the polycondensation reaction is allowed to proceed. Also, there are a method of blending slurry of particles dispersed in ethylene glycol, water or other solvent and polyester resin raw materials using a vented kneading extruder, a method of blending dried particles and polyester-based resin raw materials using a kneading extruder, or the like.

Hereinafter, a preferable amorphous component in the fold holding layer is described.

2.2. Amorphous Component of Polyester Raw Materials Contained in Fold Holding Layer The fold holding layer in the present invention refers to a layer having the highest amount of the amorphous component described below among layers that constitute the film according to the present invention. When the film includes two or more layers having the highest amount of the amorphous component, all the layers are referred to as the fold holding layers. The polyester used in the fold holding layer of the present invention preferably contains the amorphous component in an amount of preferably 12% by mol or more, more preferably 13% by mol or more, particularly preferably 14% by mol or more. The upper limit of the amount of the amorphous component is 30% by mol, preferably 28% by mol or less. The amount of the amorphous component here refers to the total amount of the monomer component of a carboxylic acid or a diol that can form the amorphous component. This is because when either one of the acid component and the diol component in one ester component unit (one unit formed through an ester bond of a carboxylic acid monomer to a diol monomer) is a monomer that can form the amorphous component, the ester unit can be regarded as being amorphous.

The fold holding layer having less than 12% by mol of the amorphous component is not preferred because a molten resin is crystallized, even if quenched and solidified after extruded from a die, in the following stretching and heat fixing step, to make it difficult to attain a fold holding angle of 70 degrees or less.

On the other hand, the fold holding layer having 30% by mol or more of the total of the amorphous component is capable of decreasing the fold holding angle of the film but increases thickness unevenness of the film to deteriorate the printability of the film. Further, the fold holding layer having 30% by mol or more of the amorphous component is not preferred because it makes the film exceed a shrinkage rate of 15%.

Further, the ethylene terephthalate unit contained in the fold holding layer is preferably 50% by mol or more and 85% by mol or less in 100% by mol of constituent units of the polyester. The fold holding layer having less than 50% by mol of the ethylene terephthalate unit may possibly make the film insufficient in, for example, mechanical strength and heat resistance. On the other hand, the fold holding layer having more than 85% by mol of the ethylene terephthalate unit is relatively small in amount of the amorphous component to make it difficult to attain a fold holding angle of 70 degrees or less.

Further, the fold holding layer of the present invention preferably contains the amorphous component in an amount range of 4% by mol or more and 30% by mol or less larger than the amount of the amorphous component contained in a layer other than the fold holding layer (the difference is in a range of 4% by mol to 30% by mol that is obtained by deducting the amount of the amorphous component contained in a layer other than the fold holding layer from the amount of the amorphous component contained in the fold holding layer). When the difference in amount of the amorphous component is less than 4% by mol, layers have nearly single composition of raw materials. With the intention of forming a film that includes layers having the same composition of raw materials, that is, a film having a single layer structure, if a single layer film is formed that has 12% by mol or more and 30% by mol or less of the amorphous component to attain a fold holding angle of 70 degrees or less, the shrinkage rate of the film exceeds 15% and the thickness unevenness increases as described above. In contrast, if the amount of the amorphous component is set at 12% by mol or less to keep the shrinkage rate within 15% or less and the thickness unevenness within a prescribed range, the fold holding angle of the film exceeds 70 degrees. Thus, the film having a nearly single layer structure is not capable of satisfying all the necessary physical properties of the film. The difference in amount of the amorphous component is further preferably 4.5% by mol or more between the fold holding layer and a layer other than the fold holding layer. Since the upper limit of the amorphous component contained in the fold holding layer is 30% by mol, the upper limit of the difference in amount of the amorphous component is 30% by mol.

A polyester used in a layer other than the fold holding layer contains an ethylene terephthalate unit as a main constituent component and the amorphous component in the amount described above. The ethylene terephthalate unit is more preferably 60% by mol or more, more preferably 65% by mol or more in 100% by mol of constituent units of the polyester.

3. Characteristics of Polyester Film According to the Present Invention

Next, characteristics necessary for the polyester film according to the present invention are described.

3.1. Fold Holding Angle

The polyester film according to the present invention needs to have a fold holding angle of 20 degrees or more and 70 degrees or less that is measured according to the method described later. The film having a fold holding angle of 70 degrees or less is capable of giving beautiful appearance with a folded line thereof open, when folded for, for example, paper folding and packaging. The upper limit of the fold holding angle is more preferably 65 degrees, and the upper limit is further preferably 60 degrees. The fold holding angle is more preferable according as it is small. A range of the fold holding angle that can be covered by the present invention, however, is 20 degrees as the lower limit, so that even a fold holding angle of 25 degrees or more is recognized as being practically preferable.

3.2. Shrinkage Rate

The polyester film according to the present invention is to have a hot-water heat shrinkage rate of 0% or more and 15% or less both in the width direction and the longitudinal direction when treated in 80° C. hot water over 10 seconds.

The film having a shrinkage rate exceeding 15% largely shrinks to be incapable of retaining an original shape thereof when subjected to high temperature, for, for example, lamination with another material. The upper limit of the hot-water heat shrinkage rate is preferably 14%, more preferably 13%. On the other hand, the film having a hot-water heat shrinkage rate of lower than 0 means stretching of the film and is not preferred because the film is, in the same manner as in the case of having a high shrinkage rate, incapable of retaining an original shape thereof.

3.3. Thickness Unevenness in Longitudinal Direction

The polyester film according to the present invention preferably has a thickness unevenness of 18% or less for a measurement length of 10 m in the longitudinal direction. The film having a value exceeding 18% for thickness unevenness in the longitudinal direction is not preferred because the film easily generates printing defects in printing thereon. The thickness unevenness in the longitudinal direction is more preferably 16% or less, particularly preferably 14% or less. The thickness unevenness in the longitudinal direction is more preferable according as it is small. The lower limit of the thickness unevenness, however, is considered to be maximally about 1% for the performance of a film forming apparatus.

3.4. Thickness Unevenness in Width Direction

The film preferably has a thickness unevenness of 18% or less for a measurement length of 1 m in the width direction. The film having a value exceeding 18% for thickness unevenness in the width direction is not preferred because the film easily generates printing defects in printing thereon. The thickness unevenness in the width direction is more preferably 16% or less, particularly preferably 14% or less. The thickness unevenness in the width direction is more preferable according as it is close to 0%. The lower limit of the thickness unevenness, however, is considered to be reasonably 1% for the performance of a film forming apparatus and easy production.

3.5. Haze

The polyester film according to the present invention preferably has a haze of 1% or more and 15% or less. The film having a haze exceeding 15% deteriorates its transparency to become inferior in visibility of contents when formed into a packaging material such as a bag. The upper limit of the haze is more preferably 13% or less, particularly preferably 11% or less. The haze is more preferable according as it is low to increase the transparency. The lower limit of the haze, however, is 1% for the present technical level and even a haze of 2% or more is recognized as being practically sufficient.

3.6. Thickness

The polyester film according to the present invention preferably has a thickness of 3 µm or more and 200 µm or less. The film having a thickness of less than 3 µm is not preferred because the film makes processing such as printing difficult (deteriorates its handleability). On the other hand, the film having a thickness of more than 200 µm is not preferred because the film not only decreases its fold holding property, but also increases its usage weight to raise chemical costs. The film has a thickness of preferably 5 µm or more and 160 µm or less, more preferably 7 µm or more and 120 µm or less.

4. Conditions for Forming Polyester Film

4.1. Melt Extrusion

The polyester film according to the present invention can be obtained by melting polyester raw materials described in Section 2. "Polyester Raw Materials Constituting Polyester Film" with separate extruders for the fold holding layer and a layer other than the fold holding layer, and co-extruding the materials to form an unstretched laminated film, and uniaxially or biaxially stretching the film in the prescribed method described below. A film obtained by biaxial stretching (biaxially-stretched film) is more preferable. The polyester can be obtained through polycondensation of a dicarboxylic acid component and a diol component whose kinds and amounts are selected to make the polyester appropriately contain a monomer that can form the amorphous component as described above. Also, two kinds or more chip-shaped polyesters can be mixed and used as raw materials of the film.

When raw material resins are melt-extruded, it is preferred to dry polyester raw material of each layer using a drier such as a hopper drier or a paddle drier, or a vacuum dryer. The polyester raw material of each layer is dried as described above, and then melted at a temperature of 200 to 300° C. and extruded into a laminated film, using an extruder. At the extrusion, any existing method can be adopted, such as a T-die method or a tubular method.

Subsequently, the laminated film that is molten through extrusion can be quenched to give an unstretched laminated film. A method of quenching the molten resin that can be suitably adopted is a method of obtaining a substantially unoriented resin sheet by casting the molten resin on a rotary drum from a spinneret to quench and solidify the cast resin. The film may be stretched in at least either one of the lengthwise (longitudinal) direction and the transverse (width) direction. Hereinafter described is a successive biaxially stretching method of first performing lengthwise stretching and next performing transverse stretching. An adopted method, however, may be a transverse stretching-lengthwise stretching method in which the order of stretching is reversed, because the main orientation direction is only changed Alternatively, a simultaneous biaxially stretching method may be adopted.

4.2. Lengthwise Stretching

Stretching in the lengthwise direction may be performed by introducing the unstretched film into a lengthwise stretching machine in which a plurality of roll groups are continuously arranged. In the lengthwise stretching, it is preferred to perform preliminary heating with a preheating roll until the film temperature reaches 65° C. to 90° C. The film having a temperature of lower than 65° C. is not preferred because the film becomes hard to be stretched during the stretching in the lengthwise direction and thus easily causes breakage. The film having a temperature of higher than 90° C. is not preferred because the film easily adhesively attaches to a roll to easily wind around the roll or easily generate dirt on the roll.

When the film temperature reaches 65° C. to 90° C., the lengthwise stretching is performed. The lengthwise stretch ratio may be set at 1 time or more and 5 times or less. A lengthwise stretch ratio of 1 time means no lengthwise stretching performed, so that the lengthwise stretch ratio is to be set at 1 time to obtain a transverse uniaxial stretched film and is to be set at 1.1 times or more to obtain a biaxially stretched film. The upper limit of the lengthwise stretch ratio may be any value. A too high lengthwise stretch ratio, however, makes transverse stretching hard to easily cause breakage, so that the lengthwise stretch ratio is preferably 5 times or less.

Loosening the film in the longitudinal direction after the lengthwise stretching (relaxation in the longitudinal direction) enables reduction in shrinkage rate of the film in the longitudinal direction that has been generated by the lengthwise stretching. Further, the relaxation in the longitudinal direction enables reduction of bowing phenomena (distortion) that occur in a tenter. Since the polyester film according to the present invention contains an amorphous raw material, the shrinkage property in the longitudinal direction that has been generated by the lengthwise stretching is considered to be dominant to bowing distortion. This is because the film is heated while gripped at both ends thereof in the film width direction in the following steps such as transverse stretching and a final heat treatment, so that only a center portion of the film is shrunk in the longitudinal direction. The relaxation rate in the longitudinal direction is preferably 0% or more and 70% or less (a relaxation rate of 0% means no relaxation performed). The upper limit of the relaxation rate in the longitudinal direction is determined according to raw materials used and conditions for the lengthwise stretching, and the relaxation cannot be performed exceeding this upper limit. In the polyester film according to the present invention, the upper limit of the relaxation rate in the longitudinal direction is 70%. The relaxation in the longitudinal direction can be performed by heating the lengthwise stretched film at a temperature of 65° C. to 100° C. or lower and adjusting the difference in speed of rolls. As heating means, any of a roll, near-infrared light, far-infrared light, and a hot air heater can be used. The relaxation in the longitudinal direction can not only be performed directly after the lengthwise stretching, but can also be performed by narrowing a gap between clips in the longitudinal direction during, for example, the transverse stretching (including a preheating zone) or the final heat treatment (in the relaxation at this timing, both ends in the film width direction are also relaxed in the longitudinal direction to reduce bowing distortion). Thus, the relaxation in the longitudinal direction can be performed at any timing.

After the relaxation in the longitudinal direction (or the lengthwise stretching when the relaxation is not performed), the film is preferably once cooled and is preferably cooled with a cooling roll having a surface temperature of 20 to 40° C.

4.3. Transverse Stretching

It is preferred to perform the transverse stretching at a stretch ratio of about 3.5 to 5 times at 65° C. to 110° C. after the lengthwise stretching while the film is gripped by clips at both end edges in the width direction of the film in a tenter. Before performing the stretching in the transverse direction, it is preferred to perform preliminary heating, and the preliminary heating may be performed until the surface temperature of the film reaches 75° C. to 120° C.

After the transverse stretching, it is preferred to let the film pass through an intermediate zone in which active heating operation is not performed. A final heat treatment zone following a transverse stretch zone in the tenter has higher temperature than the transverse stretch zone does, so that heat of the final heat treatment zone (a hot blast itself or radiation heat) flows into a transverse stretch step without the intermediate zone. Without the intermediate zone, the temperature in the transverse stretch zone is not stabilized to not only deteriorate the thickness accuracy of the film but also vary the physical properties of the film, such as heat sealing strength and the shrinkage rate. Therefore, it is preferred to let the transversely stretched film pass through the intermediate zone for lapse of a prescribed time and then to perform the final heat treatment. It is important, in this intermediate zone, to block an accompanying flow that accompanies running of the film and a hot blast from the transverse stretch zone and the final heat treatment zone in such a manner that strip-shaped paper is hung in the almost completely vertical direction when the paper is hung down without letting the film pass through the intermediate zone. About 1 second to 5 seconds are sufficient as the passing time through the intermediate zone. A passing time of less than 1 second indicates insufficient length of the intermediate zone that makes the heat blocking effect short. On the other hand, while the intermediate zone is preferably long, the facility becomes large when the intermediate zone is too long, thus a passing time of about 5 seconds is sufficient.

4.4. Final Heat Treatment

It is preferred to perform a heat treatment at a transverse stretch temperature or higher and 180° ° C. or lower in the final heat treatment zone after the film passes through the intermediate zone. The heat treatment gives no effect when the heat treatment temperature is lower than the transverse stretch temperature. A heat treatment temperature of lower than the transverse stretch temperature is not preferred because the 80° C. hot-water shrinkage rate of the film becomes higher than 15%. The shrinkage rate of the film lowers according as the heat treatment temperature is high. A heat treatment temperature of higher than 180° C., however, is not preferred because such a temperature increases the haze of the film to higher than 15% not allowing the film to retain transparency.

It is possible to reduce the shrinkage rate in the width direction by shrinking the distance between the clips in the tenter at any rate during the final heat treatment (relaxation in the width direction). Therefore, it is preferred to perform the relaxation in the width direction in a range of 0% or more and 10% or less in the final heat treatment (a relaxation rate of 0% means no relaxation performed). While the shrinkage rate in the width direction lowers according as the relaxation rate in the width direction is high, the upper limit of the relaxation rate is determined according to raw materials used, conditions for the stretching in the width direction, and the heat treatment temperature, and the relaxation cannot be performed exceeding this upper limit. In the polyester film according to the present invention, the upper limit of the relaxation rate in the width direction is 10%.

The passing time through the final heat treatment zone is preferably 2 seconds or more and 20 seconds or less. With the passing time being 2 seconds or less, the film passes through the heat treatment zone without the surface temperature of the film reaching a setting temperature, so that the heat treatment becomes meaningless. The heat treatment increases its effect according as the passing time is long, so that the passing time is preferably 2 seconds or more, further preferably 5 seconds or more. A long passing time, however, requires a huge facility, so that a passing time of 20 seconds or less is practically sufficient.

Thereafter, both end parts of the film are cut and removed and the film is simultaneously wound to give a polyester film roll.

EXAMPLES

Next, the present invention will be described more concretely by way of Examples and Comparative Examples. However, the present invention is by no means limited by modes of the Examples, and may appropriately be modified within a range not deviated from the gist of the present invention.

The methods of evaluating the films are as follows. When the longitudinal direction and the width direction cannot be immediately identified due to, for example, a small area of a film, measurement may be performed tentatively setting the longitudinal direction and the width direction. Even when the longitudinal direction and the width direction that have been tentatively determined are different from the true directions by 90 degrees, any particular problem never occurs.

<Method of Evaluating Film>

[Fold Holding Angle]

The films were left in a thermostatic chamber under an environment of 28° C. and 50% RH for 24 hours. Immediately after that, each of the films was cut into a 10 cm×10 cm square under an environment of 20° C. and 65% RH and folded in two twice to be folded in four (a 2.5 cm×2.5 cm square). When folding the film, the short sides of a rectangle formed by first folding the film in two were set to be a lengthwise direction. Subsequently, a 5 kg weight with a bottom size of 3 cm×3 cm was placed on the four-folded film for 20 seconds. After removing the weight, the angle at which the folded film opened was measured and obtained. The angle is 0 degree when the film is completely folded and is 180 degrees when the film is completely open.

[Hot-Water Heat Shrinkage Rate]

The film was cut into a 10 cm×10 cm square and immersed in 80±0.5° C. hot water with a no-load condition for 10 seconds to be shrunk. Thereafter, the film was immersed in 25° C.±0.5° C. water for 10 seconds and taken out from water. Subsequently, the dimensions in the lengthwise and transverse directions of the film were measured, and the shrinkage rate in each direction was obtained in accordance with the following formula 1. The measurement was performed twice and the average value of the measurements was obtained.

Shrinkage rate=((Length before shrinkage−Length after shrinkage)/Length before shrinkage)×100 (%)     formula 1

[Haze]

The haze was measured using a haze meter (300A manufactured by NIPPON DENSHOKU INDUSTRIES CO., LTD.) according to JIS-K-7136. The measurement was performed twice and the average value of the measurements was obtained.

[Thickness Unevenness in Longitudinal Direction]

The film was sampled into a 11 m (longitudinal direction)×40 mm (width direction) roll shape and measured for thickness thereof continuously along the longitudinal direction of the film at a measurement speed of 5 m/min using a continuous contact-type thickness meter manufactured by Mikuron (measurement length: 10 m). With the maximum thickness in the measurement defined as Tmax., the minimum thickness as Tmin., and the average thickness as Tave., the thickness unevenness in the longitudinal direction of the film was calculated from the following formula 2.

Thickness unevenness={(Tmax.−Tmin.)/Tave.}×100 (%)     formula 2

[Thickness Unevenness in Width Direction]

The film was sampled into a 40 mm (length)×1.2 mm (width) wide band shape and measured for thickness thereof continuously along the width direction of the film sample at a measurement speed of 5 m/min using a continuous contact-type thickness meter manufactured by Mikuron (measurement length: 1 m). With the maximum thickness in the measurement defined as Tmax., the minimum thickness as Tmin., and the average thickness as Tave., the thickness unevenness in the width direction of the film was calculated from the formula 2.

[Aroma Retaining Property]

Using the film, a bag was prepared by heat sealing (three-sided sealing) inner layer surfaces of the film so that the inside dimension of the bag was 50 mm×50 mm. Into that bag was inserted an absorbent cotton impregnated with 0.2 cc of each test perfume shown below, and the bag was hermetically packaged. Next, this bag was put into a 100 ml glass bottle, and the bottle was hermetically closed with a lid. This glass bottle was left under a normal temperature condition of 25° C., the lid was opened after 1 hour, and then an odor sensory test in the glass bottle was performed. In the odor sensory test, the following three-grade sensory evaluation was performed for the presence or absence of sensing the aroma of the perfume by the same 5 panelists.

good: No aroma was sensed
fair: Aroma was slightly sensed
poor: Aroma was sensed Used as perfumes were total 6 smell components, i.e., strawberry essence, orange essence, apple essence, and vanilla essence manufactured by KOBAYASHI PERFUMERY CO., LTD. and menthol and limonene manufactured by NACALAI TESQUE, INC., and an aroma retaining effect of the film was evaluated for each of the smell components.

Preparation of Polyester Raw Materials

Synthesis Example 1

A stainless steel autoclave equipped with a stirrer, a thermometer, and a partial reflux type cooler was filled with 100% by mol of dimethyl terephthalate (DMT) as a dicarboxylic acid component, 100% by mol of ethylene glycol (EG) as a polyhydric alcohol component such that ethylene glycol was 2.2 times the amount of dimethyl terephthalate by molar ratio, and a transesterification reaction was carried out using 0.05% by mol (relative to the acid component) of zinc acetate as a transesterification catalyst, while generated methanol was distilled away from the system. Subsequently, 0.225% by mol (relative to the acid component) of antimony trioxide was added thereto as a polycondensation catalyst, and a polycondensation reaction was carried out at 280° C. under a reduced pressure of 26.7 Pa to give a polyester (A) having an intrinsic viscosity of 0.75 dl/g. This polyester (A) is polyethylene terephthalate.

Synthesis Example 2

Polyesters (B) to (E) were obtained that were prepared in the same procedures as in Synthesis Example 1 but by changing the monomers used. Table 1 shows the composition of each polyester. In Table 1, TPA represents terephthalic acid, BD represents 1,4-butanediol, NPG represents neopentyl glycol, CHDM represents 1,4-cyclohexane dimethanol, and DEG represents diethylene glycol. In the production of the polyester (E), SiO2 (Silysia 266 manufactured by Fuji Silysia Chemical Ltd.) was added as a lubricant in a proportion of 7,000 ppm relative to the polyester. Each polyester was appropriately formed into a chip shape. Table 1 shows the composition of the polyesters (B) to (E).

TABLE 1

| Polyester raw material | Composition of polyester raw material (mol %) | | | | | | | Addition amount of lubricant (ppm) |
|---|---|---|---|---|---|---|---|---|
| | Carboxylic acid component | | Diol component | | | | | |
| | TPA | IPA | EG | BD | NPG | CHDM | DEG | |
| A | 100 | 0 | 99 | 0 | 0 | 0 | 1 | 0 |
| B | 100 | 0 | 68 | 0 | 30 | 0 | 2 | 0 |
| C | 100 | 0 | 67 | 0 | 0 | 30 | 3 | 0 |
| D | 100 | 0 | 0 | 100 | 0 | 0 | 0 | 0 |
| E | 100 | 0 | 99 | 0 | 0 | 0 | 1 | 7000 |

Example 1

The polyesters A, B, D, and E were mixed in a mass ratio of 5:60:30:5 as raw materials for a fold holding layer (layer A) and the polyesters A and E were mixed in a mass ratio of 95:5 as raw materials for a layer (layer B) other than the fold holding layer.

The mixed raw materials for the layer A and the layer B were each charged into separate biaxial screw extruders and both the materials were melted at 270° C. The molten resins were bonded to each other by a feed block halfway through flow channels, discharged from a T-die, and cooled on a chill roll set at a surface temperature of 30° C. to give an unstretched laminated film. The flow channels for the molten resins were set such that both surface layers of the laminated film became the layers A and a center layer became the layer B (two-kind three-layer structure, layer A/layer B/layer A), and the discharge amount was adjusted such that a ratio in thickness between the layer A and the layer B became 50:50.

The unstretched laminated film that had been obtained by cooling and solidification was guided to a lengthwise stretching machine in which a plurality of roll groups were continuously arranged, preliminarily heated until the film temperature reached 80° C. on a preheating roll, and then stretched to 4.1 times. The film that had been just lengthwise stretched was allowed to enter a heating furnace set at 100° C. by a hot air heater, and a 20% relaxation treatment in the longitudinal direction was performed making use of the difference in speed between rolls at an entrance and at an exit of the heating furnace. Subsequently, the lengthwise stretched film was forcibly cooled by a cooling roll set at a surface temperature of 25° C.

The relaxation-treated film was guided to a transverse stretching machine (tenter), preliminarily heated for 5 seconds until the surface temperature reached 95° C., and then stretched in the width direction (transverse direction) to 4.0 times. The transversely stretched film was directly guided to an intermediate zone and allowed to pass through the zone at 1.0 second. In the intermediate zone of the tenter, a hot blast from a final heat treatment zone and a hot blast from a transverse stretch zone were blocked in such a manner that strip-shaped paper was hung in the almost completely vertical direction when the paper is hung down without letting the film pass through the intermediate zone.

Subsequently, the film that had passed through the intermediate zone was guided to the final heat treatment zone and heat-treated at 115° C. for 5 seconds. At this time, a 3% relaxation treatment in the width direction was performed simultaneously with the heat treatment, by narrowing a gap between clips in the film width direction. The film that passed through the final heat treatment zone was cooled and cut and removed at both edges thereof, and wound in a roll shape with a width of 500 mm to continuously produce a 20-µm-thick biaxially stretched film over a prescribed length. The characteristics of the film obtained was evaluated according to the methods described above. Table 2 shows production conditions and Table 3 shows evaluation results.

Examples 2 to 8

Polyester films were formed by variously changing the blending ratio of raw materials, the extrusion conditions of resins, and the conditions for the transverse stretching, the intermediate heat treatment, the lengthwise stretching, and the final heat treatment, and the films were evaluated. Tables 2 and 3 show the conditions for producing the films of Examples 2 to 8 and characteristics of the films, respectively.

Comparative Example 1

For the layers A and B, the polyesters A, B, D, and E were mixed in a mass ratio of 5:60:30:5 as raw materials, and an unstretched laminated film was obtained in the same conditions as in Example 1. Subsequently, the film was lengthwise stretched in the same conditions as in Example 1, and the lengthwise stretched film was cooled without letting the film pass through the heating furnace (that is, the relaxation rate in the longitudinal direction is 0%). The lengthwise stretched film was guided to the tenter and subjected to the transverse stretching and the final heat treatment in the same conditions as in Example 1 except that the final heat treatment temperature was set at 96° C. and the relaxation rate in the width direction was set at 0%, to give a biaxially stretched film with a width of 500 mm and a thickness of 20 µm. Table 2 shows production conditions and Table 3 shows evaluation results.

Comparative Example 2

The polyesters A, B, and E were mixed in a mass ratio of 65:30:5 as raw materials for the layer A and the same polyester raw materials as in Example 8 were mixed as raw materials for the layer B. Subsequently, a film was formed in the same conditions as in Example 8 except that the final heat treatment temperature was set at 180° C., to give a biaxially stretched film with a width of 500 mm and a thickness of 20 µm. Table 2 shows production conditions and Table 3 shows evaluation results.

TABLE 2

|  |  | Example 1 | Example 2 | Example 3 | Example 4 | Example 5 | Example 6 |
|---|---|---|---|---|---|---|---|
| Raw material composition of both surface layers (Layer A) (mass %) | Polyester A | 5 | 5 | 10 | 10 | 0 | 0 |
|  | Polyester B | 60 | 60 | 75 | 75 | 30 | 95 |
|  | Polyester C | 0 | 0 | 0 | 0 | 45 | 0 |
|  | Polyester D | 30 | 30 | 10 | 10 | 20 | 0 |
|  | Polyester E | 5 | 5 | 5 | 5 | 5 | 5 |
| Raw material composition of center layer (Layer B) (mass %) | Polyester A | 95 | 95 | 55 | 55 | 5 | 95 |
|  | Polyester B | 0 | 0 | 30 | 30 | 54 | 0 |
|  | Polyester C | 0 | 0 | 0 | 0 | 0 | 0 |
|  | Polyester D | 0 | 0 | 10 | 10 | 36 | 0 |
|  | Polyester E | 5 | 5 | 5 | 5 | 5 | 5 |
| Amorphous component (mol %) | Layer A | 18.2 | 18.2 | 22.7 | 22.7 | 22.5 | 28.4 |
|  | Layer B | 0.0 | 0.0 | 8.8 | 8.8 | 16.5 | 0.0 |
|  | Difference (Layer A − Layer B) | 18.2 | 18.2 | 13.9 | 13.9 | 6.0 | 28.4 |
| Layer structure |  | A/B/A | A/B/A | A/B/A | A/B/A | A/B/A | A/B/A |
| Extrusion ratio of raw material resin (Layer A (%)/Layer B (%)) |  | 50/50 | 50/50 | 50/50 | 50/50 | 50/50 | 50/50 |
| Lengthwise stretching | Stretch temperature (° C.) | 80 | 80 | 90 | 90 | 85 | 90 |
|  | Stretch ratio | 4.1 | 4.1 | 4.1 | 4.1 | 4.1 | 4.1 |
| Relaxation in the longitudinal direction | Heating furnace temperature (° C.) | 100 | 100 | 100 | 100 | 100 | 100 |
|  | Relaxation rate (%) | 20 | 20 | 20 | 20 | 20 | 20 |
| Transverse streching | Stretch temperature (° C.) | 95 | 95 | 100 | 100 | 100 | 100 |
|  | Stretch ratio | 4.0 | 4.0 | 4.0 | 4.0 | 4.0 | 4.5 |
| Final heat treatment temperature | Temperature (° C.) | 115 | 140 | 120 | 130 | 130 | 130 |
|  | Relaxation rate in the width direction (%) | 3 | 3 | 3 | 6 | 3 | 10 |
| Film thickness (μm) |  | 20 | 20 | 20 | 20 | 20 | 20 |

|  |  | Example 7 | Example 8 | Comparative Example 1 | Comparative Example 2 |
|---|---|---|---|---|---|
| Raw material composition of both surface layers (Layer A) (mass %) | Polyester A | 40 | 10 | 5 | 65 |
|  | Polyester B | 45 | 0 | 60 | 30 |
|  | Polyester C | 0 | 75 | 0 | 0 |
|  | Polyester D | 10 | 10 | 30 | 0 |
|  | Polyester E | 5 | 5 | 5 | 5 |
| Raw material composition of center layer (Layer B) (mass %) | Polyester A | 70 | 55 | 5 | 55 |
|  | Polyester B | 30 | 30 | 60 | 30 |
|  | Polyester C | 0 | 0 | 0 | 0 |
|  | Polyester D | 0 | 10 | 30 | 10 |
|  | Polyester E | 0 | 5 | 5 | 5 |
| Amorphous component (mol %) | Layer A | 13.2 | 22.7 | 18.2 | 8.6 |
|  | Layer B | 8.6 | 8.8 | 18.2 | 8.8 |
|  | Difference (Layer A − Layer B) | 4.6 | 13.9 | 0.0 | −0.2 |
| Layer structure |  | A/B/A | A/B/A | A/B/A | A/B/A |
| Extrusion ratio of raw material resin (Layer A (%)/Layer B (%)) |  | 50/50 | 50/50 | 50/50 | 50/50 |
| Lengthwise stretching | Stretch temperature (° C.) | 90 | 90 | 80 | 90 |
|  | Stretch ratio | 4.1 | 4.1 | 4.1 | 4.1 |
| Relaxation in the longitudinal direction | Heating furnace temperature (° C.) | 100 | 100 | — | 100 |
|  | Relaxation rate (%) | 20 | 20 | 0 | 20 |
| Transverse streching | Stretch temperature (° C.) | 100 | 100 | 95 | 90 |
|  | Stretch ratio | 4.0 | 4.0 | 4.0 | 4.0 |
| Final heat treatment temperature | Temperature (° C.) | 110 | 115 | 96 | 180 |
|  | Relaxation rate in the width direction (%) | 3 | 5 | 0 | 3 |
| Film thickness (μm) |  | 20 | 30 | 20 | 20 |

TABLE 3

| | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Folding angle | 34 | 28 | 55 | 61 | 43 | 44 | 65 | 52 | 36 | 82 |
| Hot-water heat shrinkage rate (%) 80° C.; Longitudinal direction | 10.2 | 2.1 | 5.2 | 3.1 | 3.5 | 10.3 | 6.4 | 6.3 | 33.0 | 0.3 |
| Width direction | 13.5 | 3.6 | 7.8 | 3.5 | 9.8 | 13.6 | 9.3 | 6.4 | 36.4 | 0.8 |
| Haze (%) | 4.2 | 5.3 | 4.6 | 5.4 | 5.1 | 3.6 | 5.8 | 4.8 | 3.3 | 13.2 |
| Thickness unevenness (%) Longitudinal direction | 11.9 | 11.8 | 5.2 | 3.8 | 16.6 | 13.5 | 7.9 | 4.0 | 18.1 | 3.4 |
| Width direction | 14.1 | 14.4 | 6.8 | 5.1 | 17.4 | 9.7 | 9.5 | 5.7 | 19.2 | 3.9 |
| Aroma retaining proeny Strawberry essence | good | good | good | good | good | good | good | good | good | good |
| Orange essence | good | good | good | good | good | good | good | good | good | good |
| Apple essence | good | good | good | good | good | good | good | good | good | good |
| Vanilla essence | good | good | good | good | good | good | good | good | good | good |
| Menthol | good | good | good | good | good | good | good | good | good | good |
| Limonene | good | good | good | good | good | good | good | good | good | good |

[Evaluation Results of Films]

Table 3 shows that all the films of Examples 1 to 8 were excellent in folding angle, shrinkage rate, haze, thickness unevenness, and aroma retaining property, giving good evaluation results. On the other hand, the film of Comparative Example 1 was excellent in folding angle, haze, and aroma retaining property but was unusable because the film was high in shrinkage rate and thickness unevenness.

In addition, the film of Comparative Example 2 was excellent in shrinkage rate, thickness unevenness, and aroma retaining property but had a haze of as high as 13.2% and a folding angle of 82 degrees. This film is not only bad in transparency but is also unsuitable for folding purpose.

INDUSTRIAL APPLICABILITY

A polyester film according to the present invention has an excellent fold holding property and has extremely low heat shrinkage property at a high-temperature environment, and is excellent in transparency. In addition, the polyester film according to the present invention is excellent in aroma retaining property to give a laminate and a packaging bag that are excellent in aroma retaining property, the laminate including at least one layer of the polyester film according to the present invention, and the packaging bag including the laminate.

The invention claimed is:

1. A polyester film which is formed with a polyester resin whose main constituent component is ethylene terephthalate as a main component, and satisfies requirements (1) to (5) below:
   (1) the polyester film having two or more layers that include at least one fold holding layer, and wherein the fold holding layer is present on at least one of the film surfaces;
   (2) the fold holding layer comprising a total of 12% by mol or more and 30% by mol or less of at least one monomer component that forms an amorphous component in all monomer components of the fold holding layer, and a difference in amount of an amorphous component being 4% by mol or more and 30% by mol or less that is obtained by deducting an amount of an amorphous component in a layer other than the fold holding layer from the amount of the amorphous component in the fold holding layer;
   (3) the polyester film having a fold holding angle of 20 degrees or more and 70 degrees or less;
   (4) the polyester film having a heat shrinkage rate of 0% or more and 15% or less both in a longitudinal direction and a width direction when treated in 80° C. hot water over 10 seconds; and
   (5) the layer other than the fold holding layer comprises an ethylene terephthalate unit as a main constituent component and the amorphous component.

2. The polyester film according to claim 1, which has a haze of 1% or more and 12% or less.

3. The polyester film according to claim 2, which has a thickness unevenness of 18% or less both in the longitudinal direction and the width direction.

4. The polyester film according to claim 3, which is a uniaxially stretched film or a biaxially stretched film.

5. A packaging bag including at least one of the polyester film according to claim 4.

6. A laminate comprising at least one layer of the polyester film according to claim 4.

7. A packaging bag including at least one of the laminate according to claim 6.

8. The polyester film according to claim 2, which is a uniaxially stretched film or a biaxially stretched film.

9. The polyester film according to claim 1, which has a thickness unevenness of 18% or less both in the longitudinal direction and the width direction.

10. The polyester film according to claim 9, which is a uniaxially stretched film or a biaxially stretched film.

11. The polyester film according to claim 1, which is a uniaxially stretched film or a biaxially stretched film.

12. A packaging bag including at least one of the polyester film according to claim 1.

13. A laminate comprising at least one layer of the polyester film according to claim 1.

14. A packaging bag including at least one of the laminate according to claim 13.

* * * * *